United States Patent [19]

Kuster

[11] Patent Number: 4,746,070
[45] Date of Patent: May 24, 1988

[54] ROLL REFINER AND METHOD FOR OPERATING SAME

[75] Inventor: Werner R. Kuster, Niederuzwil, Switzerland

[73] Assignee: Gebruder Buhler AG, Uzwil, Switzerland

[21] Appl. No.: 888,276

[22] Filed: Jul. 22, 1986

Related U.S. Application Data

[63] Continuation of Ser. No. 687,500, Jan. 2, 1985, abandoned, which is a continuation of Ser. No. 418,569, Sep. 15, 1982, abandoned.

[30] Foreign Application Priority Data

Sep. 16, 1981 [CH] Switzerland .................. 5972/81

[51] Int. Cl.$^4$ .............................................. B02C 4/04
[52] U.S. Cl. ........................................ 241/37; 99/485; 241/231
[58] Field of Search .................. 241/30, 34, 37, 64, 241/159, 222, 231, 234, 224, 225, 223, 286, 290, 235; 99/486, 489, 493, 485

[56] References Cited

U.S. PATENT DOCUMENTS

| | | | |
|---|---|---|---|
| 2,027,283 | 1/1936 | McFadden | 241/231 |
| 3,182,587 | 5/1965 | Woodhall | 241/37 X |
| 3,292,869 | 12/1966 | Beyeler | 241/37 |
| 3,372,878 | 3/1968 | Verdier | 241/37 X |
| 3,468,488 | 9/1969 | Karrer et al. | 241/34 |
| 3,509,815 | 5/1970 | Lloyd | 241/37 X |
| 3,618,865 | 11/1971 | Sirnach et al. | 241/34 X |

FOREIGN PATENT DOCUMENTS

| | | |
|---|---|---|
| 1030553 | 5/1958 | Fed. Rep. of Germany . |
| 1033995 | 7/1958 | Fed. Rep. of Germany . |
| 1085016 | 7/1960 | Fed. Rep. of Germany ...... 241/231 |
| 1220238 | 6/1966 | Fed. Rep. of Germany . |
| 1293002 | 4/1969 | Fed. Rep. of Germany ...... 241/231 |
| 2632966 | 1/1978 | Fed. Rep. of Germany ...... 241/159 |
| 1115823 | 4/1956 | France . |
| 1059587 | 2/1967 | United Kingdom . |
| 1080782 | 8/1967 | United Kingdom . |

Primary Examiner—Mark Rosenbaum
Assistant Examiner—Joseph M. Gorski
Attorney, Agent, or Firm—Merchant, Gould, Smith, Edell, Welter & Schmidt

[57] ABSTRACT

The two feed rolls of a roll refiner comprising at least four rolls for processing viscous materials, such as chocolate masses, are regulated with respect to their rotational speeds by means of a suitable regulating system. The two feed rolls rotate in a fixed speed ratio to each other at speeds determined by the prevailing operating conditions. The particle size and/or the output quantity of the processed material may be held constant by this regulation.

1 Claim, 1 Drawing Sheet

ROLL REFINER AND METHOD FOR OPERATING SAME

This is a continuation of application Ser. No. 687,500, filed Jan. 2, 1985, now abandoned, which is a continuation of application Ser. No. 418,569, filed Sept. 15, 1982, now abandoned.

BACKGROUND OF THE INVENTION

1. Field of the Invention

The invention refers to a roll refiner or roller mill comprising at least four rolls for processing viscous materials by homogenizing and grinding procedures, in particular chocolate masses, printing paints, and the like. The invention equally refers to a method for operating the roll refiner.

2. Description of the Prior Art

Roll refiners having one or several rolls adjustable as to their rotational speeds are known in the art. One such roller mill disclosed in French. Pat. No. 111 58 23 comprises three rolls and has the rotational speed of its discharge roll arranged to be adjustable with respect to the rotational speed of the middle roll. A particular embodiment of this roller mill is provided with feed rolls rotating at a fixed speed ratio to each other. The discharge roll, on the other hand, is adjustable in an infinitely variable manner, thereby to influence the degree of spread of the processed material, dependent upon the difference in rpm between the middle roll and the last roll. The degree of processing of the material is influenced by way of the last roll gap, while at the same time the rotational speeds of the second and third rolls are regulated.

Another roll refiner disclosed in the German Auslegeschrift No. 10 33 995 is arranged to have the rotational speed of any of its rolls, in particular the rotational speed of the two feed rolls, adjustable in an infinitely variable manner.

Regulating the rotational speeds of both feed rolls is more effective for regulating the quantity of a material fed the roll refiner per unit time than regulating the rotational speed of only one of the feed rolls. In particular, if the two feed rolls are arranged to rotate in a fixed rotational speed ratio to each other, this will make the range of rotational speeds covered by regulation, and thus the pulled-in quantity of material greater, than if the speed of only one of the feed rolls is regulated.

A roll refiner disclosed in the British Pat. No. 10 80 782 is arranged to have the rotational speeds of both or its feed rolls regulated in an infinitely variable manner; however, this roll refiner was built for batch production with return flow.

Finally, the German Pat. No. 10 30 553 discloses a calender mill, in which each roll may be regulated in regards to its rotational speed independent of the others, or else together with the others and in the same sense. However, a regulating system of this kind is comparatively complicated.

SUMMARY OF THE INVENTION

Hence from what has been explained heretofore it should be apparent that the art is still in need of a roll refiner not associated with the drawbacks and limitations of the state-of-the-art proposals.

It is therefore a primary object of the present invention, to provide a novel construction of a roll refiner, which effectively and reliably fulfills existing needs in the art without having the aforementioned drawbacks and limitations.

Another and more specific object of the invention relates to a new and improved roll refiner, in which the fineness and/or the output quantity of the processed material can be regulated as desired, and in particular kept constant, if certain physical properties of the processed material, such as its viscosity, are subject to time dependent variations.

The foregoing and other objects are attained in accordance with one aspect of the invention by providing the two feed rolls defining the feed gap for the material with a common drive independent of the other rolls, such that these two feed rolls are driven at a fixed rotational speed ratio relative to each other, their rotational speeds being adjustable (controllable) relative to the rotational speeds of the other rolls, by preference in infinitely variable manner.

Since the width of the gap between the last two rolls which rotate at constant speeds in a measure for the obtainable fineness and for the output quantity of the material, this gap may serve as control parameter.

The regulation of the roll refiner may be performed using a combination of the following devices:

(a) a measuring device for measuring the gap width between the last two rolls, connected to (b) a comparator, for determining the difference between the actual and the desired value of this gap width, and (c) a regulator (controller) connected to the comparator, for regulating the rotational speed of said variable speed drive of the feed rolls.

These components are well known in the art and readily obtainable.

The following features of the invention are of practical importance:

In comparison with roll refiners lacking the aforementioned regulation, the invention requires only one additional drive and a regulating system for the rolls required to be regulated. A drive motor of only small capacity may be used to drive the rolls of constant rotational speed. If the processed material is difficult to feed, the regulation may effect an improvement in the feeding conditions.

The fineness and the output quantity of the processed material can be held constant, if the mass density of the material remains unchanged. The ability to keep the quality of the processed material and particularly its fineness, i.e. its maximum particle size, as well as its output quantity constant, are important features of the invention. In practice, the material fineness is mainly a function of the gap width and the rotational speeds of the last two rolls.

Variations of some of the physical properties of the processed material, such as its viscosity, may arise during operation. These variations will affect the counterpressure, i.e. the pressure exerted by the material onto the rolls, as well as the feeding conditions of the material, and thus the gap width of the first rolls. This will lead at the same time to variations in the output quantity of the material, which will eventually affect the gap width of the last rolls too.

This latter gap width is, however, kept constant by regulating the rotational speeds of the feed rolls, which regulation will then compensate for both the changes in the width of the feed gap and the changes in the pulled-in quantity of material per unit time.

It is to be noted, that by keeping the rotational speed ratio of the feed rolls constant, and by the functional requirement, by reason of which the second roll must rotate at a higher speed than the first one, the material will be transferred to the second roll in each instance of regulation.

BRIEF DESCRIPTION OF THE DRAWING

The invention will be better understood and objects other than those set forth above will become apparent when consideration is given to the following detailed description thereof. Such description makes reference to the annexed drawing wherein:

The FIG. 1 shows a schematic diagram of the roll refiner according to the invention, with the system regulating its operation.

DETAILED DESCRIPTION OF THE PREFERRED EMBODIMENTS

Figure 1:
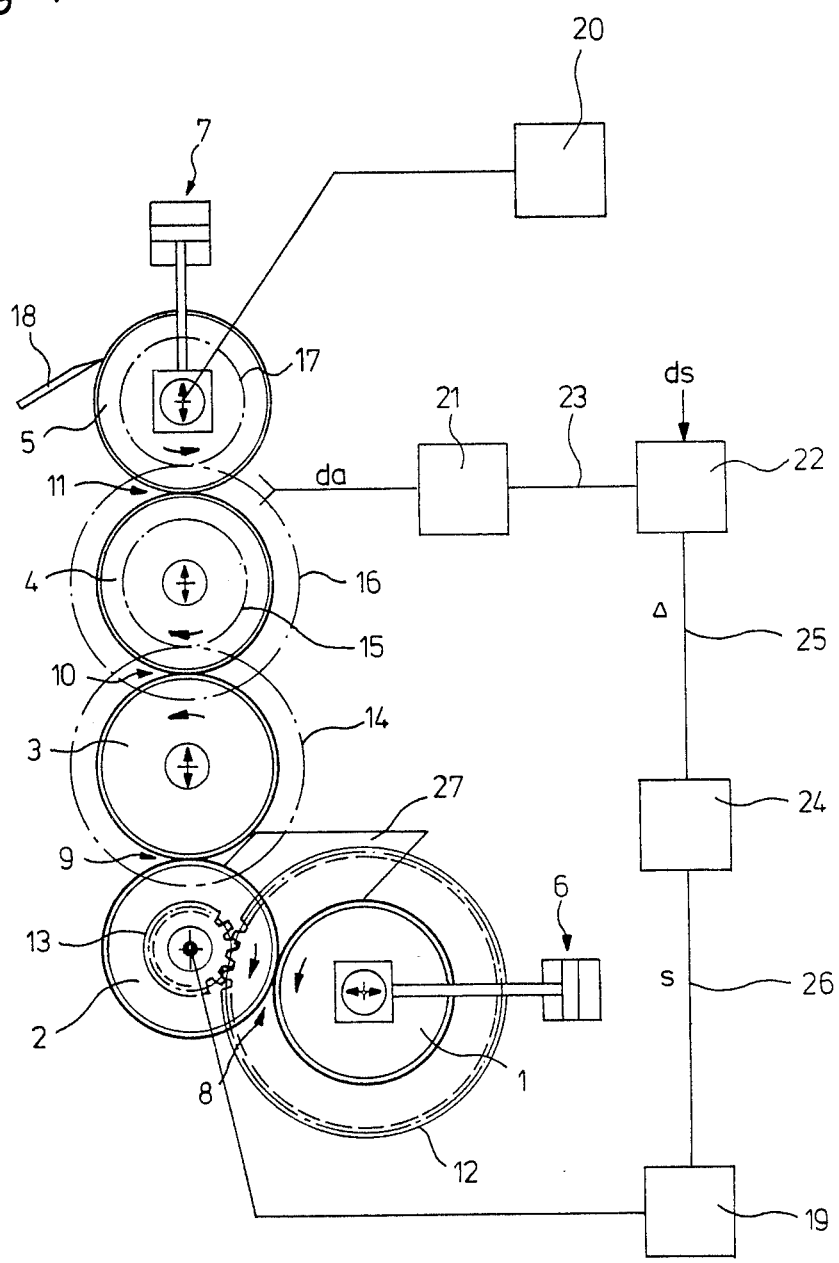

The roll refiner of FIG. 1 is shown as having the feed rolls 1 and 2, the grinding rolls 3 and 4, and the discharge roll 5. These rolls are suspended and pivotably supported within a suiable frame not shown in the drawing. The roll 2 is fixedly supported, whereas the roll 1 and the rolls 3 to 5 are movably supported on the frame.

Hydraulic pressing devices 6 and 7 are provided for pressing the rolls 1 and 5 against the roll 2, each of the pressing devices 6, 7 being arranged to generate a predetermined, constant pressure. Thus, in operation, the rolls 1 and 5 are each pressed against by a constant force. The rolls 3 and 4 automatically assume new positions, to compensate for any pressure differences that arise between the rolls. These rolls are thus components of a floating roll system.

Gap 8 is the feed gap, gaps 9 to 11 are the grinding gaps, a gap being defined as the location at which the distance between two cooperating rolls is a minimum.

A measuring device 21, a comparator 22 and a regulator 24 are mutually connected via the conductors 23 and 25. The measuring device 21 measures the width of the grinding gap 11.

The rolls 1, 2 are connected via the gear wheels 12, 13, whereas the rolls 3, 4, 5 via the gear wheels 14, 15, 17, in accordance with the respective design speed ratios. The rolls 1, 2 are driven by a drive motor 19 of variable rotational speed, whereas the rolls 3, 4, 5 by a motor 20 of constant rotational speed. The reference numeral 18 refers to a discharge knife for removing the material.

The roll refiner is operated in the following manner:

The rolls 1 to 5 rotate as required clockwise or counterclockwise. The rotational speeds of the rolls increase from one roll to the next, following the sequence from 1 to 5. This is a necessary condition for the material to be transferred from one roll to the next.

Material is supplied to the feeding chute 27, which communicates with the feed gap 8. From here the material is fed to the feed gap 8 intermediate the feed rolls 1, 2 and is processed; and after it has been pulled through the feed gap 8 it goes on to the second roll 2. The material then passes between the rolls 2, 3 and is pulled through the grinding gap 9. It continues to be processed here and then it is transferred to the third roll 3. The process continues in this manner, until the material reaches the fifth roll 5. From here it is finally removed from the roll refiner by means of the discharge knife 18.

The system for regulating the rotational speeds of the feed rolls functions continuously to regulate the entire operation of the roll refiner. The measuring device 21 measures and records the measured width $d_a$ of the last roll gap 11. This value $d_a$ is fed the comparator 22 via the conductor 23. The comparator 22 computes the difference $\Delta = d_a - d_s$, where $d_s$ is supplied from the outside and represents a desired width value of the last roll gap 11. This value $\Delta$ is fed the regulator 24 via the conductor 25. A signal S derived from the value $\Delta$ within the regulator 24 is fed via the conductor 26 to the variable speed drive motor 19, to be effective for regulating the motor speed and the rotational speeds of the feed rolls.

A change in some property of the processed material, such as an increase in its viscosity, which takes place at any moment during the processing operation, will cause the feed gap 8 to increase in width. This will affect the last roll gap 11 too, which will increase in width as soon as the respective material has passed through it, with the result of coarser quality, i.e. reduced fineness, of the material. This gap increase is undesirable and regulation will be necessary to recover the originally set quality.

Regulation will now ensue by means of the signal S passing from the measuring device 21 via the comparator 22 to the regulator 24, to cause a decrease in the rotational speeds of the feed roll 1, 2 via the drive motor 19. This will cause a decrease of the quantity of material fed the roll refiner per unit of time, the actual gap width value $d_a$ being continuously monitored and made to approach the desired value $d_s$. This signal $d_s$ fed the comparator 22 from the outside and representing a desired width of the last roll gap 11 may assume any value selected to correspond to a desired material fineness.

While there is shown and described present preferred embodiments of the invention, it is to be distinctly understood that the invention is not limited thereto but may be otherwise variously embodied and practiced within the scope of the following claims.

What is claimed is:

1. A roller refiner for processing viscous materials by homogenizing and grinding, said roller refiner comprising:
   at least two groups of rollers in abutment to form a contiguous system with input and output ends and the first of said groups being feed rollers and the second of said groups being output rollers, at least one roller in said first group being fixed in position,
   bias means for applying a predetermined force onto one of said second group of rollers toward said first group of rollers so that all rollers between said fixed roller and said one of said second group of rollers automatically assume new positions in order to keep forces applied therebetween constant,
   means for variably driving at least one of said feed rollers independently of said output rollers,
   means for driving said output rollers at a constant speed independent of said variable driving means,
   means for directly measuring the gap between any two rollers in said output group, said measurement being independent of the temperature of said rollers,
   means for comparing the gap value to a predetermined desired value, and
   feedback means for adjusting the speed of said first feed roller in response to the difference between the measured gap value and the predetermined value.

* * * * *